US012777068B2

(12) United States Patent
Trivedi et al.

(10) Patent No.: US 12,777,068 B2
(45) Date of Patent: Oct. 27, 2026

(54) INTERNET OF THINGS MALWARE KNOWLEDGE EXTRACTOR AND DETECTOR

(71) Applicant: AT&T Intellectual Property I, L.P., Atlanta, GA (US)

(72) Inventors: Amee Trivedi, Amherst, MA (US); Yaron Koral, Cherry Hill, NJ (US); Hasit Dani, Hillsborough, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 51 days.

(21) Appl. No.: 18/893,386

(22) Filed: Sep. 23, 2024

(65) Prior Publication Data

US 2026/0089185 A1 Mar. 26, 2026

(51) Int. Cl.
*H04L 9/40* (2022.01)

(52) U.S. Cl.
CPC .................................. *H04L 63/145* (2013.01)

(58) Field of Classification Search
CPC ..................................................... H04L 63/145
See application file for complete search history.

(56) References Cited

U.S. PATENT DOCUMENTS 10,346,614 B1 * 7/2019 Ko ........................ H04L 9/3247
2016/0301707 A1 * 10/2016 Cheng ..................... H04L 43/00
2017/0126704 A1 * 5/2017 Nandha Premnath ........................ G06F 21/566
2017/0223046 A1 * 8/2017 Singh .................. H04L 63/1491
2020/0293655 A1 * 9/2020 Long .................... G06N 3/0895
2023/0344797 A1 * 10/2023 Filatov ................ H04L 63/0236
2024/0333747 A1 * 10/2024 Parla ..................... G06F 16/334
2024/0403560 A1 * 12/2024 Radu ..................... G06F 40/284

OTHER PUBLICATIONS

Jeon et al., "Dynamic Analysis for IoT Malware Detection With Convolution Neural Network Model", May 2020, IEEE Access, vol. 8, pp. 96899-96911 (Year: 2020).*

* cited by examiner

*Primary Examiner* — Kenneth W Chang
(74) *Attorney, Agent, or Firm* — Guntin & Gust, PLC; Andrew Gust

(57) ABSTRACT

Aspects of the subject disclosure may include, for example, training a large language model (LLM) on data related to malware that may infect internet of things (IoT) devices communicating on a mobility network, receiving, from the LLM, information about malware affecting the IoT devices, conducting a dialog with the LLM to develop additional information about the malware affecting the IoT devices, wherein the conducting the dialog with the LLM comprises providing textual questions to the LLM and receiving textual answers to the textual questions from the LLM, and providing, to a device operator associated with the IoT devices, diagnostic information about a malware threat to IoT devices in the network and prescriptive information that may be used to avoid the malware threat, wherein the diagnostic information and the prescriptive information are based on the dialog with the LLM. Other embodiments are disclosed.

19 Claims, 8 Drawing Sheets

300

600

INTERNET OF THINGS MALWARE KNOWLEDGE EXTRACTOR AND DETECTOR

FIELD OF THE DISCLOSURE

The present disclosure relates to telecommunication networks, and Internet of Things (IoT). More specifically, the present disclosure pertains to advanced methods and systems for extracting malware knowledge, detecting malware anomalies, and suggesting remediation for the malwares in telecommunication networks, and IoT devices to maintain network reliability, data privacy, system reliability, compliance with regulations, and protect against fraudulent activities.

BACKGROUND

In the digital age, the specter of malware looms large, posing significant risks to individuals and organizations alike. Existing malware anomaly detection systems, while vital, often fall short in their communication with end-users. Typically, these systems only alert users to potential threats by providing basic information such as the name of the malware, its category, and the time of detection.

BRIEF DESCRIPTION OF THE DRAWINGS

Reference will now be made to the accompanying drawings, which are not necessarily drawn to scale, and wherein.

DETAILED DESCRIPTION

Figure 1:
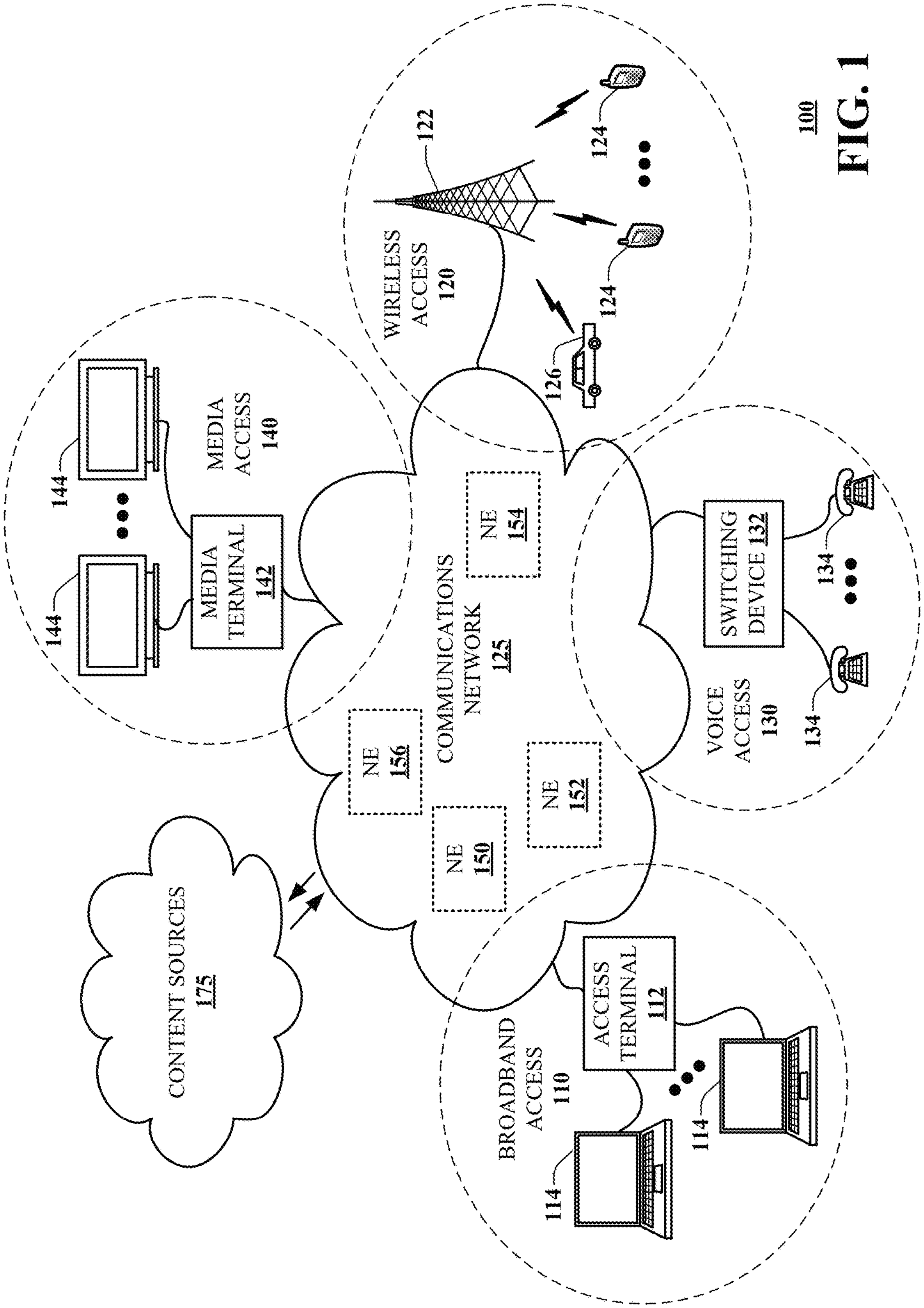
FIG. 1 is a block diagram illustrating an exemplary, non-limiting embodiment of a communications network in accordance with various aspects described herein.

The subject disclosure describes, among other things, illustrative embodiments for identifying a threat such as malware that may affect devices in a network, such as internet of things (IoT) devices or telematics devices communicating on a mobility network. A knowledge extractor is designed to extract, sanitize, and design a malware database. Further, a large language model is trained with relevant malware information to become expert in malware issues. A dialogue may be had with the large language model to develop readily understood textual information about possible risks to the devices from malware or other threats, and about protecting actions that may be taken. This text, image, video information may be conveyed to a device operator to take steps to protect the devices. Other embodiments are described in the subject disclosure.

One or more aspects of the subject disclosure include receiving network and device data for internet of things (IoT) devices communicating on a mobility network, providing at least some of the network and device data to a large language model (LLM), receiving, from the LLM, information about malware affecting the IoT devices, and conducting a dialog with the LLM to develop additional information about the malware affecting the IoT devices. Aspects of the subject disclosure further include providing, to a device operator associated with the IoT devices, malware diagnostic information and malware prescriptive information, wherein the malware diagnostic information and malware prescriptive information are based on the dialog with the LLM, and communicating, over the mobility network to the IoT devices, information to modify the IoT devices to protect the IoT devices from the malware.

One or more aspects of the subject disclosure include training a large language model (LLM) on data related to malware that may infect internet of things (IoT) devices communicating on a mobility network, receiving, from the LLM, information about malware affecting the IoT devices, conducting a dialog with the LLM to develop additional information about the malware affecting the IoT devices, wherein the conducting the dialog with the LLM comprises providing text, image, video questions to the LLM and receiving text, image, video answers to the questions from the LLM, and providing, to a device operator associated with the IoT devices, diagnostic information about a malware threat to IoT devices in the network and prescriptive information that may be used to avoid the malware threat, wherein the diagnostic information and the prescriptive information are based on the dialog with the LLM.

One or more aspects of the subject disclosure include receiving operational data for Internet of Things (IoT) devices communicating on a mobility network, wherein the IoT devices are associated with a device operator, providing at least some of the operational data to a large language model (LLM), the LLM trained on information about malware in IoT devices, receiving, from the LLM, information about a malware risk to the IoT devices, receiving additional malware risk information from the LLM, wherein the receiving the additional malware risk information is based on queries submitted to the LLM about the malware risk to the IoT devices, and providing, to the device operator, diagnostic information about the malware risk to the IoT devices and prescriptive information that may be used to avoid the malware risk to the IoT devices.

Referring now to FIG. 1, a block diagram is shown illustrating an example, non-limiting embodiment of a system 100 in accordance with various aspects described herein. For example, system 100 can facilitate in whole or in part identifying a threat such as malware that may affect devices in a network, such as internet of things (IoT) devices or telematics devices communicating on a mobility network. A large language model (LLM) may be trained and provide expert advice in a readily understandable format which can be conveyed to a device operator to prevent damage to the IoT devices. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
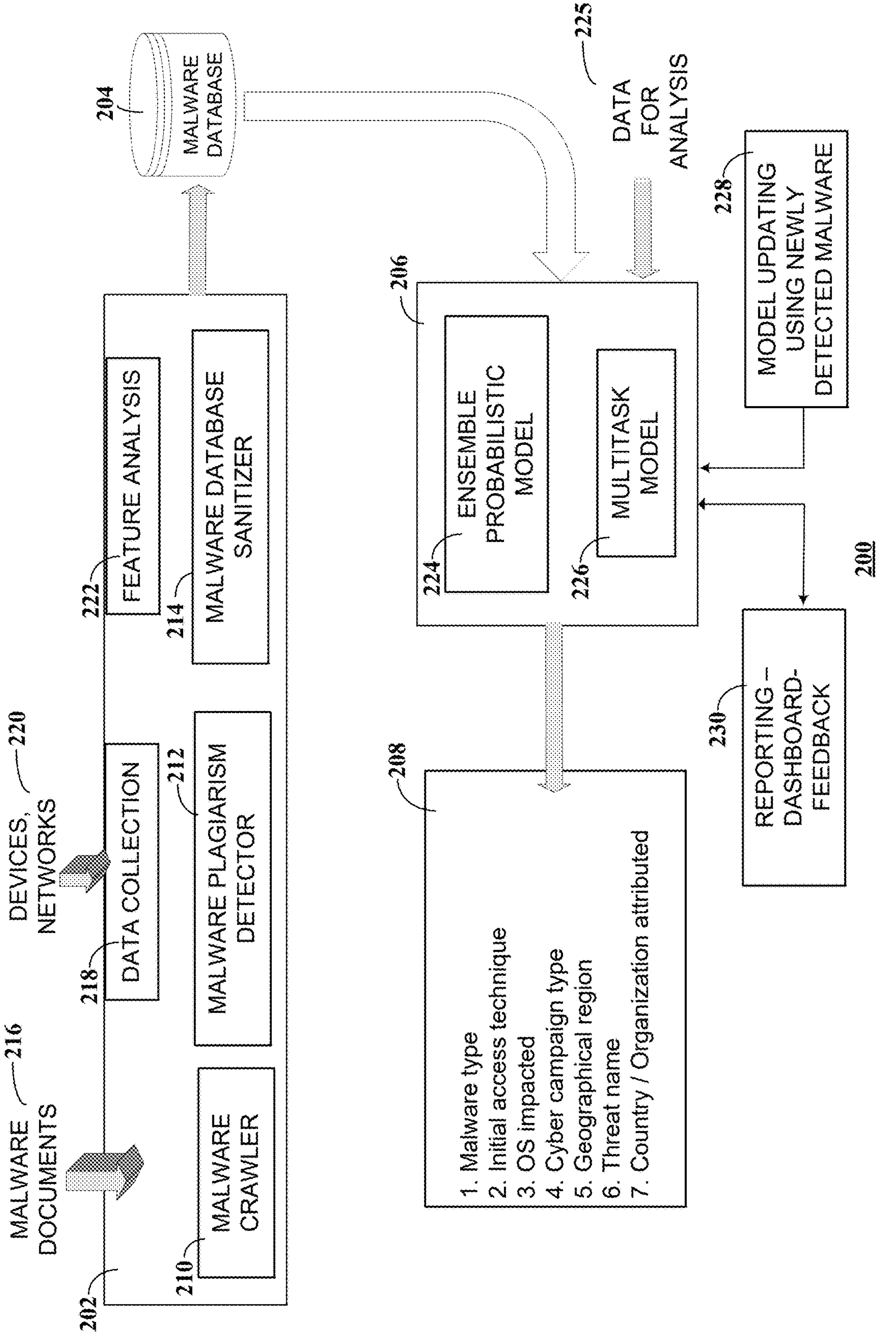
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communications network 125 of FIG. 1 in with various aspects described herein. The system 200 is an embodiment of a system for detecting malware anomalies in, for example, a portion of the communications network 125.

Malware, short for malicious software, refers to any software intentionally designed to cause damage to a computer, server, client, network, or digital device. Malware can be used to steal private information, gain unauthorized access to information or systems, deprive access to information, or unknowingly interfere with the user's computer security and privacy.

Malware is a broad category that encompasses a variety of malicious programs, each designed with specific harmful intents and functionalities. The primary purpose of malware is to invade, damage, or disable computers and computer systems, often while concealing its presence from users and administrators. Malware can be spread through various methods, including email attachments, malicious websites, and infected USB drives.

Some examples of malware include viruses, trojan horses, ransomware, worms, and spyware. Viruses are generally self-replicating programs that attach themselves to other programs or applications and spread from computer to computer. Trojan horses may disguise themselves as legitimate software to trick users into installing them into a system. Ransomware encrypts a user's data and holds it hostage until a ransom is paid. Worms are self-replicating programs that can spread across networks without human intervention. Spyware secretly collects information about a user's activities without their knowledge. Other types of malware are known, as well.

One target of malware attacks is Internet of Things (IoT) devices. In general, IOT devices are objects that may be connected to the Internet for communication. IoT devices can include anything from a refrigerator to a light bulb, or may include industrial sensors, devices on a motor vehicle or agricultural vehicle, generally referred to as a "connected car,", and the vehicle itself in the case of a vehicle-to-everything (V2X) system. An IoT device may include any suitable components or elements. In general, an IoT device includes one or more sensors, a processing system including a processor and memory, controlling software, and a communication circuit. The communication circuit enables communication with, for example, a cellular network. An IoT device can thus collect and exchange data with a remote device such as a server.

Malware anomalies are known to occur in IoT devices and networks. For example, IoT devices can create a network security risk. IoT devices are often interconnected and communicate across networks. An infected device can serve as a gateway for malware to spread across the network, compromising the security of other devices and the network itself. IoT devices may create a data privacy risk. Like connected cars, IoT devices collect, transmit, and store vast quantities of data, which can include sensitive personal information. Malware can exploit these devices to steal data, leading to privacy breaches.

IoT devices may create vulnerabilities to the operational integrity of a system or location. Many IoT devices control critical aspects of infrastructure, homes, and businesses, such as security systems, lighting, and heating. Malware can disrupt these operations, leading to financial loss or even endangering lives in scenarios where critical systems are compromised.

The economic ramifications of malware attacks on IoT devices can be significant. Such attacks can lead to costly downtime, necessitate expensive repairs or replacements, and damage the reputation of affected brands.

Regulatory compliance may become an issue. With the increasing recognition of the noted risks, governments as well as public and private regulatory bodies are implementing stricter regulations around IoT security. Detecting and mitigating malware is essential for compliance with these evolving standards.

Accordingly, the detection of malware anomalies in IoT devices is not just about protecting individual devices but safeguarding the broader ecosystem of interconnected technology. The potential for harm in these interconnected environments makes proactive detection and response to malware critical for maintaining safety, privacy, functionality, and trust.

In the current environment, the threat of malware looms large, posing significant risks to individuals and organizations alike. Existing malware anomaly detection systems, when implemented, often fall short in their communication with end-users. Typically, these conventional systems alert users to potential threats by providing basic information such as the name of the malware, its category, and the time of detection. However, for individuals who are not experts in cybersecurity, this information can be cryptic and unhelpful. For instance, being informed that a system has been targeted by "Mirai" or "TV95box" does little to convey the severity or potential damage these threats might cause. In these examples, Mirai is a type of malware that targets IoT devices. Mirai is designed to infect vulnerable devices like IP cameras, DVRs, and routers, turning them into a network of remotely controlled "bots" or "zombies." This network is known as a botnet.

Recognizing this gap in user education and response efficacy, a new and more sophisticated malware detection solution has been developed. Embodiments provide a comprehensive method and system for malware knowledge extraction and detection of anomalies in telecommunication networks, IoT devices, and connected cars by leveraging advanced analytics, machine learning algorithms, and artificial intelligence techniques. The method and system combine the analysis of packet flow data, malware details and language model to provide an efficient and accurate approach for detecting anomalies.

Embodiments of the system enable a shift from merely notifying users about the detection of malware to offering a comprehensive explanation of the potential impact of the malware, using an ensemble of machine learning multi-task multi-label model, language models, and probabilistic models. This enhanced approach aims to demystify for users the threats posed by various types of malware, making malware risks and solutions accessible and understandable to the layperson.

For example, under exemplary embodiments, instead of simply alerting a user to the presence of a malware such as the Mirai botnet, the alert may include detailed information identifying the Mirai botnet, identifying any specific dangers the malware presents, and possible or likely outcomes of an infection. Such information in some embodiments may encompass explanations of how Mirai could enlist the user device into a botnet army, potentially leading to privacy breaches, system instability, or participation in distributed denial-of-service (DDoS) attacks without the user's knowledge, for example.

Beyond merely informing the user, embodiments of the disclosed system and method are designed to empower users. By understanding the nature and severity of a threat, individuals are better equipped to take proactive steps to protect themselves as well as devices and networks for which the user is responsible. Such protective steps may range from implementing stronger security measures, like changing passwords or updating software, to more technical responses such as isolating infected devices from the user network to prevent the spread of malware.

This shift towards a more informative and user-friendly approach in malware detection not only enhances individual cybersecurity but also contributes to the broader digital ecosystem's health. By educating users about the threats they face and how to respond effectively, embodiments of the system and method can collectively raise the bar and provide better defense against cyber threats including malware and including in IoT devices. The implementation of such sophisticated systems marks a significant advancement in cybersecurity, moving from a reactive posture to one that is proactive and empowering for end users.

In an example, a network operator operates a data network that handles traffic of customers. The data network may be a mobility network such as a cellular network providing radio access to user equipment in service areas, such as wireless access 120 in FIG. 1. In particular embodiments, the mobility network provides radio access to IoT devices in a variety of locations or service areas of the mobility network. The IoT devices may be associated with a service provider, for example, such as a customer of the network operator of the mobility network. In another example the data network may be a broadband network such as broadband access 110 in FIG. 1.

The customer traffic is generally in the form of packets routed through the network. Each packet includes a header and a payload. The payload is the data of interest to the customer. The header includes address information and other control information for routing the packet. The traffic of the particular customer may be associated with the customer in any suitable manner, such as by the network address or a customer identifier.

In an exemplary embodiment, a service provider such as a utility has meters installed at each customer's premises to measure the amount of product delivered, such as natural gas or electricity. The meters include or are associated with an IoT device that can report back measured amounts of the product on a periodic basis. Such IoT devices are susceptible to malware attacks. If, for example, the meters are subject to a distributed denial of service (DDoS) attack, the service provider will generally not receive any reading or emergency alerts or other information related to the affected devices.

In a conventional system for identifying malware in a network, the system may only receive or identify threat indicators for a malware attack. Threat indicators may include or be based on an internet protocol (IP) address or a domain name. The IP address of the domain name may be known to be associated with a ransomware threat or other type of malware. The network operator may detect the threat indicator in the customer's traffic and identify the type of threat to the customer.

However, in a conventional system, the network operator can only inform the customer about the presence of the threat indicator. However, the customer may have limited awareness of the meaning of the threat indicator or the type of damage to customer facilities that the threat can cause. Further, the customer may require but have no information about what kinds of devices can be affected or how severe the threat may be. Still further, the customer may require but have no information about any geographic region being impacted or operating systems being impacted. Such information is not reliably available from a conventional threat indicator.

Such information about known threat indicators may be available, but not conveniently so. Such information may be published in white papers or research papers by security analysts who have done work investigating a particular threat indicator. The number of such documents may be tens or hundreds of documents, but the documents may be available only as a link on a network server. The documents may be repetitive or contain only very similar information. Currently, there is no way to aggregate, assemble and find insights from those documents for a related malware attack or a threat.

The system 200 of FIG. 2A creates a solution for offering to users a comprehensive explanation of the potential impact of malware using a machine learning, multi-task, multi-label model, language models, and probabilistic models. In the exemplary embodiment of FIG. 2A, the system 200 includes a malware data collector and database curator 202, a malware database 204, a model training module 206 and a characterizing question set 208. Further in this example, the system 200 includes a model updating module 228 and a reporting module 230. Other embodiments may include additional or alternate features.

The system 200 may be implemented in any suitable device or location, in any suitable manner. In an exemplary embodiment, the system is implemented in one or more servers or other data processing systems associated with or in data communication with a mobility network of a network operator, such as wireless access 120 of FIG. 1. The system 200 may have access to aspects of the network traffic in the mobility network, such as header information of packets communicated in the network. The payloads of such packets are generally unavailable due to privacy concerns. The functions illustrated in the block diagram of the system 200 may be performed, for example, by software modules operating on the servers or other data processing systems.

In general, the system 200 operates to collect documents available online about malware. The documents are collected and sanitized and stored as text in a database. Language models, including deep learning neural networks, may be used to further refine a relationship between a particular malware and a set of attributes. Data may be vectorized to enable processing large amounts of data rapidly. Based on a set of inquiries, such as impacted operating system, impacted geographical area, insights about the malware are brought to customers who may be affected by the malware. Such insights may pertain to the type of device affected, locations of affected devices, affect on the affected device, and others.

A first aspect of the system 200, provided by the malware data collector and database curator 202, includes data aggregation and sanitization. The system 200 operates to curate the malware database 204 and to sanitize the data contained in the database. The malware data collector and database curator 202 in this embodiment includes a malware crawler 210, a malware plagiarism detector 212 and a malware database sanitizer 214.

The malware crawler 210 operates to locate publicly available documents pertaining to malware. Such documents may be located in any network location, accessed via the public internet for example. In an exemplary embodiment, the malware crawler 210 is initialized or seeded with a starting point. For each malware type or malware indicator, the malware crawler 210 is provided with a starting uniform resource locator or URL. Malware types may include viruses or worms, trojan horses or ransomware, for example. The URL corresponds to an address of a specific resource on the internet such as a web page or image or other type of document. For example, the URL may include a domain name and a path name. The malware crawler 210 receives a starting URL or list of URLs to begin crawling the network to locate additional malware documents. Crawling the internet is a process where a computer program, known as a web crawler or spider, systematically visits web pages to collect information. This information can be used for various purposes such as data mining for data about specific topics such as malware.

In embodiments, the malware data collector and database curator 202 may further include a data collection module 218. The data collection module 218 collects and preprocesses data from various devices and networks 220. For example, the data collection module 218 may collect and preprocess data from IoT devices operating on the mobility network, connected cars connected to the network, as well as the mobility network and other telecommunication networks. The data collection module 218 may receive, for example, packet flow data. The packet flow data may provide a granular view of network traffic including information about source addresses and destination address of packets, packet sizes, timestamps, and quality of service (QoS) information. Such packet flow data is useful in diagnosing network problems, such as packet loss. Further, packet flow data can be used to detect and prevent security threats, such as unauthorized access or malicious attacks. Packet flow data may be captured by network probes deployed at selected points in the mobility network or using other packet capture tools.

Preprocessing by the data collection module 218 or any other module may include reformatting data collected by the malware crawler 210 or by the data collection module 218. For example, documents retrieved by the malware crawler 210 may include text symbols such as mathematical equations or drawing figures such as graphs or charts. In embodiments, such non-textual features are removed and only textual information is retained from the documents or data. Further, in some embodiments, all documents retrieved by the malware crawler 210 may be translated to a common language such as English. In another example, a document associated with one URL will include another URL as a reference. The malware crawler 210 may get trapped in an infinite loop due to the multiple URLs. Preprocessing thus includes aspects of sanitization of input data to simplify further data processing and remove problem data before the further data processing.

The malware plagiarism detector 212 operates to remove redundant or copied documents or text or information from the collected data. Some of the malware items detected include much more information than other such items. Also, there are a number of articles or documents that appear to include just copy and pasted text from another document. In effect, these copy-and-pasted documents are plagiarized from another source document. In embodiments, the redundant or copy-and-pasted information is removed from received documents and data. For example, a similarity score may be determined in any suitable manner, to determine similarity of two articles or documents. If the similarity score exceeds a predetermined threshold, such as 80 or 85 percent, then the articles are labelled as plagiarized and only one is retained in the malware database 204. Thus, the system 200 retains only a subset of the documents or articles that have been located and downloaded.

In some embodiments, the malware data collector and database curator 202 may further operate to ensure that all the malware indicators or malware types have substantially equal weighting. This may be done based on number of articles for each respective malware type processed or stored in the database, based on number of words processed for each malware type, based on number of megabytes processed for each malware type, or on any other basis. This equalization of weighting ensures that, just because one type of malware is common on the Internet than a second type of malware, the database does not store and the system 200 does not process more articles of the first type of malware than the second type of malware. Without this balancing process, a model for processing the documents will learn that the first type of malware seems to be much more important than the second type of malware based on numbers of documents.

In embodiments, this equalization of weighting may be done by statistical stratification of the dataset. Statistical stratification is a sampling technique used to ensure that a sample is representative of the entire population. It involves dividing the population into smaller, homogenous subgroups called strata based on specific characteristics. Then, a simple random sample is drawn from each stratum. Stratification helps to ensure that all segments of the population are adequately represented in the sample. By sampling from homogeneous strata, the variance within each stratum is reduced, leading to a more precise estimate of the population parameter. Stratification can be more cost-effective than simple random sampling, especially when the population is geographically dispersed or has distinct subgroups such as the different malware types.

Any suitable data sanitization efforts may be made to improve the dataset. One example is removing the bias from the model for the artificial intelligence model or machine learning model.

The malware data collector and database curator 202 further may include a feature analysis module 222. The feature analysis module 222 analyzes all the curated and sanitized malware data in the dataset for key malware features and information. In embodiments, the documents or articles downloaded by the malware crawler 210 are generally simple English text. The corpus of text generally includes a lot of stop words. Stop words in English text are common words that are often removed from text analysis tasks, such as natural language processing and information retrieval. These words are considered stop words because they don't carry significant semantic meaning and can clutter the analysis process. Examples include articles such as "a," "an," "the," prepositions such as "in," "on," "at," and conjunctions such as "and," "but," and "or." There are many other words that may be considered stop words. Stop words may be removed from the corpus of text about malware collected in the malware database 204.

Apart from the stop words, there are also some words which are keywords in the database. Keywords in an English text are the most important words that represent the main topic or theme of the text. Keywords may be context-sensitive. For example, if the system 200 is looking for a particular operating system impacted by a particular malware type, the feature analysis module 222 searches for keywords such as "Apple" and "Windows," which are words associated with particular computer operating systems.

So, the feature analysis module 222 operates to determine what questions to ask about the data and what the answers to those questions will be. Those will be important to customers. Further, the feature analysis module 222 forms a statistical means of identifying how many keywords are there, and which are the important key phrases in the corpus of text.

Following processing by the data collector and database curator 202, the articles or documents are stored in the malware database 204. Any suitable database structure or ordering may be used. The malware database 204 may be further used to develop an understanding of types and prevalence of malware detected in the system 200.

Data for analysis 225 is received at one or more artificial intelligence models or machine learning models. In an exemplary embodiment, the data for analysis 225 includes information about network traffic in a mobility network or other communications network obtained by or provided by a network operator. The traffic may originate, in some examples, from IoT devices such as motor vehicles equipped with telematics features to report on vehicle features and performance. For example, the data may be in the form of IP packets that are examined for information that may indicate presence or activity of malware in a vehicle, IoT device or another device. The data for analysis 225 may be provided to the artificial intelligence models for processing.

The model training module 206 operates to train one or more artificial intelligence or machine learning models to analyze the information in the malware database 204. In embodiments, models that may be used in the system include an ensemble probabilistic model 224 and a multitask model. One model that may be trained and used is the ensemble probabilistic model 224. An ensemble probabilistic model is a model that is a combination of multiple individual probabilistic models. The individual models may be of different types, working together to improve prediction accuracy and robustness. The individual models can be any type of probabilistic model, such as decision trees, random forests, support vector machines, or neural networks. The individual outputs of the respective models may be aggregated in any suitable manner. For example, the output predictions of all models are averaged to obtain the final prediction, or a voting procedure may be used. Still further, a weighted averaging may be used in which the predictions of individual models are weighted based on their performance, with higher-performing models given more weight.

Another model that may be trained and used is a large language model. A large language model (LLM) is a type of artificial intelligence that is designed to understand and generate human language. It is trained on massive amounts of text data, allowing it to learn patterns, grammar, and semantics. The LLM may use a deep neural network to process and understand language.

In embodiments, the LLM model is further trained as the multitask model 226 on various tasks related to malware prediction and then, based on the task prediction results, in combination with association rules, an overall malware severity may be computed by the multitask model 226. Some embodiments could use a commercially available or so-called off-the-shelf model for identifying malware. However, the answers provided by such a general-purpose model are generally not adequate for the specific purpose identifying malware in network traffic.

Accordingly, the multitask model 226 is trained and then responds to the characterizing question set 208. The characterizing question set 208 in this embodiment includes seven questions that are pertinent to identifying and characterizing a malware item or any threat indicator in a communications network. Each question is treated as a task and the multitask model 226 is queried each of the tasks, in parallel. This explains the terminology of multitask model.

In an embodiment, the multitask model 226 is a large language model (LLM) and can understand and generate human language text. Once trained, for example, using the malware database 204, the multitask model 226 can be used to generate new text by prompting the multitask model 226 with questions, such as those of the characterizing question set 208.

The questions of the characterizing question set 208 are questions that should be answered by the multitask model 226 and are part of the output of the multitask model 226. In the example, the questions of the characterizing question set 208 include the following:

1. What is the type of malware that is detected? For example, a virus, or spyware.

2 What is the initial access technique by which the malware attacks components of the network, such as an IoT device?

3. What operating system is impacted by the malware? Examples are Windows and Apple MAC OS.

4. What is the type of cyber campaign, if any?

5. What is the geographical region that is impacted by the attack? Examples might include North America or Western Europe.

6. What is the name of the threat, if any?

7. What country or organization is attributed to the malware, if any?

These noted questions are exemplary only. Other questions or additional questions may be asked or addressed for training the multitask model 226. The characterizing question set 208 is intended to be scalable.

The characterizing question set 208 is asked of the multitask model 226 for all types of threat indicators including malwares that are identified. In general, for all threat indicators, the multitask model 226 needs to provide, and inform the customer, information about the essence of a particular threat indicator or how the particular threat indicator is going to affect the customer. Moreover, the multitask model 226 provides information about how the customer may protect their devices or prevent an attack on their devices.

Thus, the reporting module 230 may provide diagnostic information about threats IoT devices in the network and prescriptive information that may be used to avoid the threat or minimize the threat or correct damage due to the threat. The LLM of the multitask model 226 is automatically given queries such as the characterizing question set 208 that prompt the multitask model 226 to provide the required diagnostic information and available prescriptive information. The provided information is current and pertinent because the multitask model 226 is trained on the information in the malware database 204. The information provided by the multitask model 226 is presented in readily understandable textual passages.

In some embodiments, the customer may engage in a type of conversation with the multitask model 226. For example, after identifying a particular threat to the customer, the multitask model 226 may prompt the customer or a human customer representative with a text message such as, "Do you want to learn more about botnet threats?" The customer may pursue that information, or other relevant answers. In other embodiments, that conversation may be had with the multitask model 226 automatically, such as by the reporting module 230. The reporting module 230 may thus have a two-way artificial conversation with the multitask model 226 to develop information that the customer needs to understand and respond to particular threats to the customer's devices. The conversation may be presented as text or played back as an audible conversation for informing the human customer representative. Any other suitable format may be used, with a goal of rapidly and clearly educating and information the customer about any detected threats and suitable responses thereto.

A model updating module 228 provides for periodic updating of the ensemble probabilistic model 224 and the multitask model 226. For example, new types of malware routinely are detected in a communication network. Information about such new malwares is added to the malware database 204 and used to update the models.

Whatever model is used, including an ensemble statistical mode and the large language model, it may be pretrained to understand a selected language. In the example, the model is pretrained to understand the English language. However, any selected language or combination of languages may be used for training and for application of the model. In one example, if a substantial portion of malware, or malware of particular type or interest, is perceived to originate in China and Russia, the LLM may be trained on the Chinese language and the Russian language to identify information about malware types in documents stored in the malware database 204. This would involve collecting a repository of relevant articles on malware written in the selected language, Chinese or Russian or another. The malware crawler 210 may need to be modified to accommodate this additional capability.

In the example, the model is pretrained to understand English, but the model is not yet trained for malware. That is, the model does not know the impact or importance of certain specific words in the malware world or the malware context. Thus, the model may be trained on the curated data stored in the malware database 205. Following training, the model not only knows how to interpret English, but it also becomes an expert in the malware domain for English articles.

A reporting module 230 provides output from the models. The reporting module 230 generates alerts and reports based on the malware severity computed by the model. These generated notifications provide information for further investigation and action. In embodiments, customers may be provided with a dashboard to display the set of malware anomalies detected. The dashboard may be presented on a webpage, for example, accessible by a customer computer system over a network. In an example, the information presented on the dashboard may be organized in any suitable format such as by manufacturer, car model, or individual cars in the case where the customer operates IoT devices associated with motor vehicles.

Figure 2B:
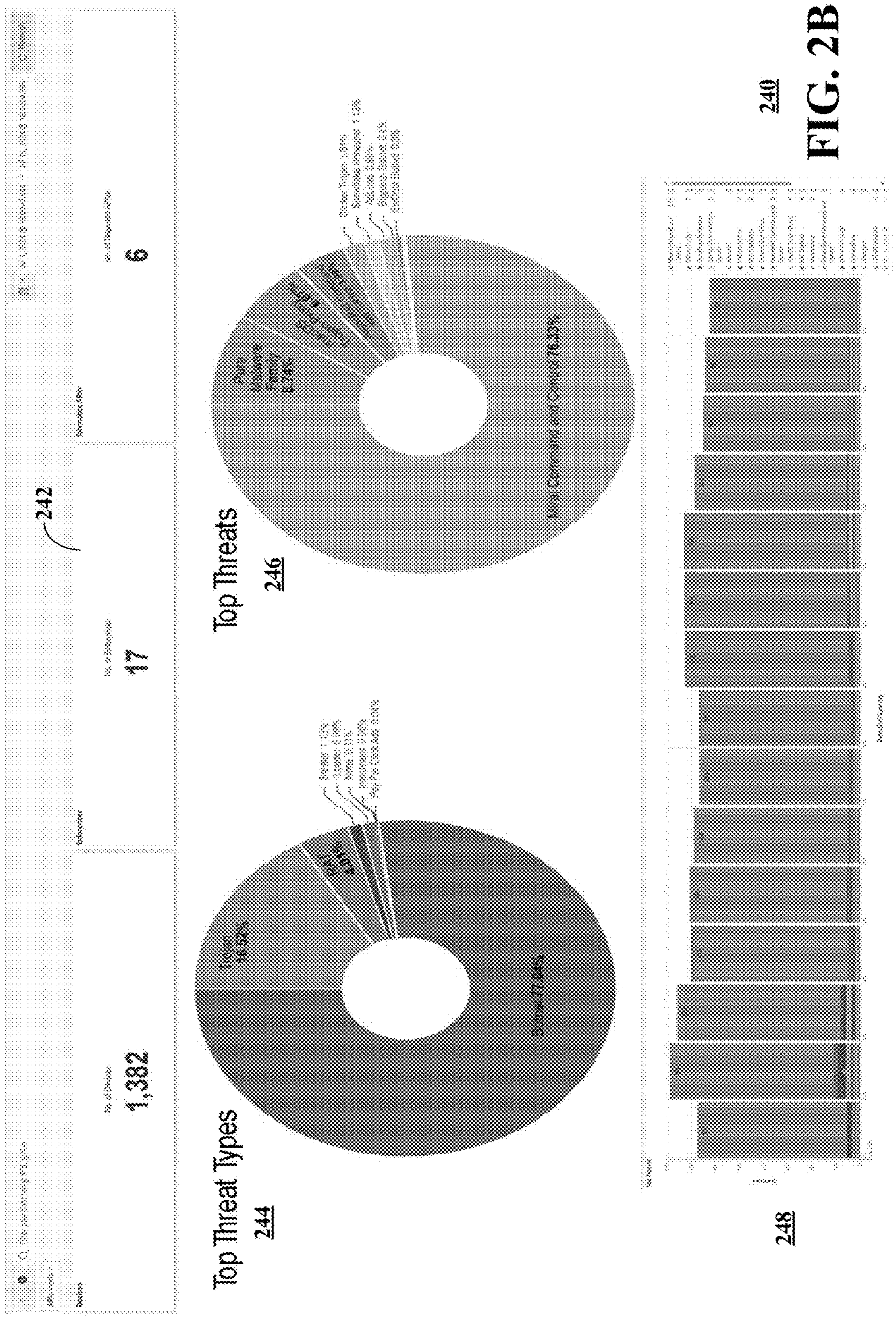
FIG. 2B is an illustrative embodiment of a customer dashboard in accordance with various aspects described herein.

FIG. 2B is an illustrative embodiment of a dashboard 240 in accordance with various aspects described herein. The dashboard 240 may be generated by the reporting module 230 of the system 200 illustrated in FIG. 2A. The illustrated example of the dashboard 240 may relate to a telematics system of an auto manufacturer, in which each vehicle includes sensors and other telematics facilities and reports information, in an internet of things manner, to the manufacturer over a cellular network operated by a network operator. The network operator receives and processes the IoT traffic on its network and detects and evaluates malware presence in the traffic.

The dashboard 240 in this example includes four sections. A first section 242 lists information about the number of devices measured or tracked or processed, 1382 in this example, the number of enterprises detected among the device information, 17 in this example, and the number of telematics access point names (APNs) included in the current data. A second section 244 includes a pie chart showing relative numbers of the top malware threat types detected in the current data. In the example, botnet malware represented 77.04% of the detected malwares; trojan horses represented 16.52% of the detected malwares.

In a third section 246, a second pie chart presents the top malware threats, by name. The top threat is identified as the Mirai Command and Control malware, corresponding to 76.33% of detected malwares; Pure Malware Family malwares are the second most common threat at 8.74% of the detected malwares. Additional malware threats are listed in the pie charts of the second section 244 and the third section 246.

The fourth section 248 of the dashboard 240 is a bar chart illustrating numbers of top threats detected, per day, over a current time period. Each bar of the bar chart corresponds to a given day and is broken down by the threat type. In this example, on each day illustrated the Mirai Command and Control malware is the most frequently detected malware threat. The number of affected devices is listed on the ordinate axis and illustrates daily increases in number of affected devices. The first day, 615 devices are affected, the second day, 680 devices are affected and on the third day in this example, 673 device are affected.

In embodiments, the dashboard may be organized or modified in any suitable fashion to better present to a user information about malware threats. For example, different color schemes may be used to emphasize different malware threats of threat types. In some embodiments, the user may select and control what data is presented on the dashboard, as well as the presentation format. For example, pie charts and bar charts are shown in the example of FIG. 2B. In other examples, different types of charts may be shown including dynamic or animated presentations of data. In the example, data from 15 days is presented. The user may instead select to see data from an entire month, or 30 days, or see monthly data over a 12-month year. One goal of the dashboard 240 is to help the customer or other user understand the nature of the malware threat and to respond appropriately.

The reporting module 230 of FIG. 2A may provide malware output in formats other than a dashboard. In one example, the malware model output includes a set of English sentences for bringing insights to the customer regarding malware presence. For example the sentences generated by the malware mode may advise that, "This particular malware is a new malware," and "This particular malware can affect devices running the Mac OS operating system," and "This malware can be resolved by updating the operating system with a new software patch." Any other information may be provided.

These exemplary steps and modules, and variations thereof, work together to provide an efficient and accurate approach for detecting malware anomalies in telecommunication networks, IoT devices, and connected cars, and in other systems as well.

Figure 2C:
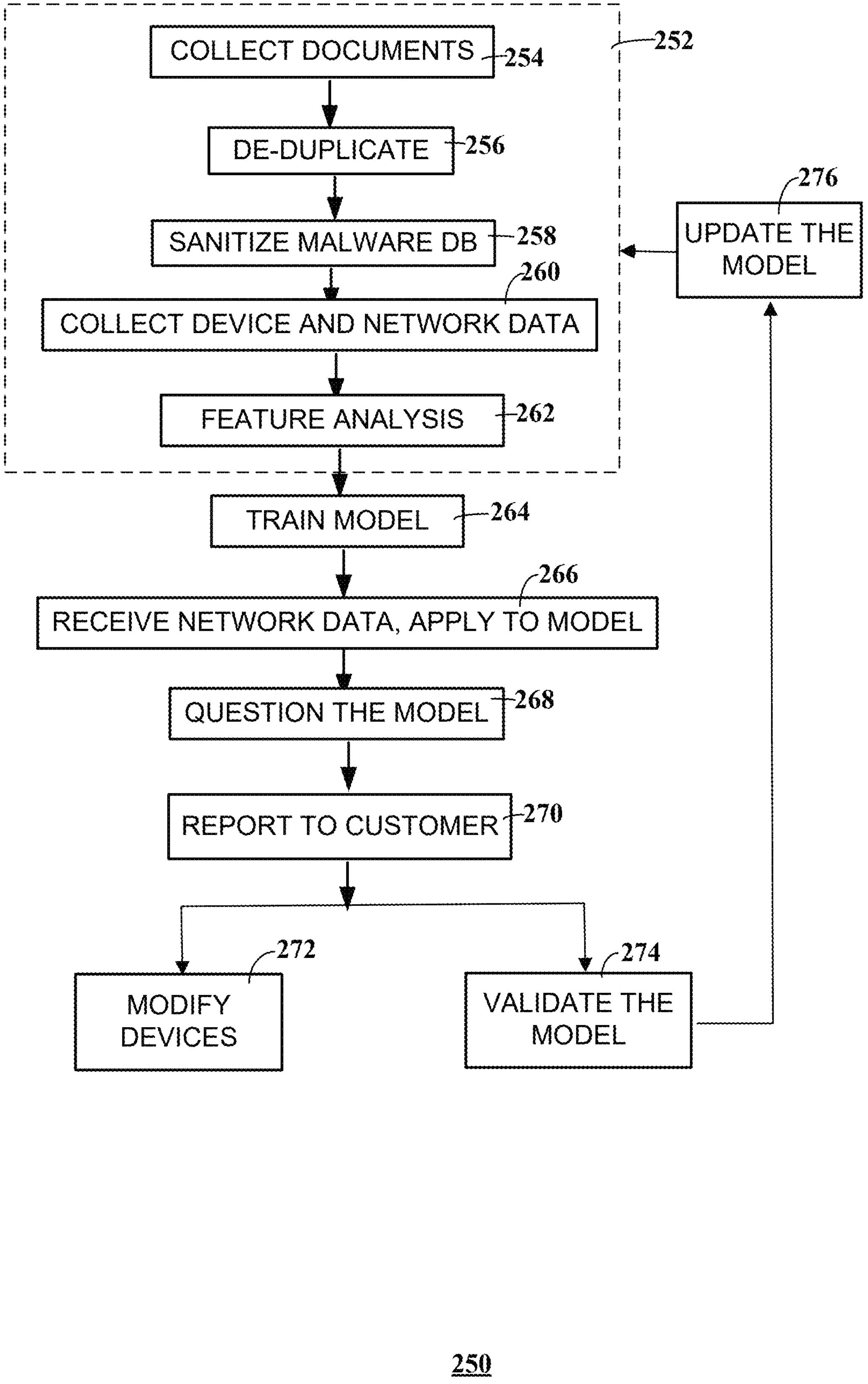
FIG. 2C depicts an illustrative embodiment of a method in accordance with various aspects described herein.

FIG. 2C depicts an illustrative embodiment of a method 250 in accordance with various aspects described herein. The method 250 for malware knowledge extraction and detection of anomalies in telecommunication networks, IoT devices, and connected cars by leveraging advanced analytics, machine learning algorithms, and artificial intelligence techniques. The method 250 combine the analysis of packet flow data, malware details and language model to provide an efficient and accurate approach for detecting anomalies. The method 250 may be performed at any convenient data processing system such as a server in a core network of the telecommunication network or in a cloud server with network access to all necessary data and information. The method 250 may be initiated in any suitable manner, such as by being launched by network operations personnel of the operator of a mobility network which serves a group of IoT devices of a customer.

Set 252 is related to building one or more artificial intelligence or machine learning processes for analyzing data in a telecommunications network. At step 254, documents and articles related to malware are collected and stored in a malware database. In an example, a network crawler may crawl the Internet locating relevant documents. The crawler may be initialized with information about a malware type of interest or a uniform resource locator (URL) of interest as a starting point, and with other initializing information. Documents may be rated on terms of relevance and documents failing to exceed a relevance threshold may be discarded. For example, a news article about existence of a certain type of malware may not be sufficiently relevant to a task of identifying characteristics, sources, threats and remedies of various types of malware and may thus be discarded rather than stored in the malware database.

At step 256, the collected documents are deduplicated. As noted above, many documents are cut-and-paste-versions of other documents and appear to be plagiarized from other documents. The redundant material may be eliminated, reducing the overall size of the database and information collected.

At step 258, the malware database is sanitized. Any extraneous or distorting information may be removed from the database. For example, any sort of bias introduced into the data may be removed or the data adjusted to remove or minimize any bias. In some cases, the documents collected at step 254 may include many more documents about a certain type of malware, such as trojan horses. The presence of a relatively large number of such documents may introduce a bias into an artificial intelligence or machine learning model. Therefore, at step 258, steps are taken to adjust data collected in the database to equalize or better distribute the data. This may be done in any suitable manner.

At step 260, the method 250 includes collecting information and data about devices operating on a communication network and the communication network itself. Such information may include information about particular Internet of Things devices, their capabilities, their locations, network addresses, and associations with one or more customers. The network data may include information about geographical location of network components, such as cellular base stations for example, and other network information.

At step 262, a feature analysis step may be performed. In embodiments, feature analysis may include analysis of the curated and sanitized malware data in the database to identify key malware features, and other information. For example, the documents or articles collected at step 254 are generally English text. However, the corpus of text generally includes a lot of stop words, including common words that are often removed from text analysis tasks. These words generally do not carry significant semantic meaning and can clutter the analysis process. There are many other words that may be considered stop words. The feature analysis of step 262 may remove such words from the malware database.

At step 264, one or more artificial intelligence models or machine learning models may be trained using data stored in the malware database. In an example, a large language model is trained using this information. The large language model is adapted to receive text input in the form of questions and, in response, provide a textual output in the form of answers to the questions, and prompts for additional questions. As a result of the training based on malware information collected and stored in the malware database, the large language model becomes, in effect, an expert in malware details, effects, and remedies.

At step 266, current network data is received at the method 250 and applied to the model. For example, the current network data may include IP packets intercepted and processed at various network locations in a telecommunications network. The IP packets may originate with or be intended for Internet of Things devices operating on the telecommunications network. For privacy purposes, only the header of the packets may be analyzed, rather than the payload. Information such as a source address, a destination address, packet size and other information may be collected and processed and passed to the model for analysis. The model operates to identify, based on its training, malware aspects of the network data.

At step 268, the model may be questioned to develop additional information and data about malware instances in the telecommunications network or in the IoT devices. Questions may pertain to, for example, types of malware detected by the model, access techniques used by the malware to infect device, operating systems that may be impacted by the malware, etc. Any suitable number or combination of questions may be submitted. In the exemplary embodiment, the model is a large language model and is adapted to receive textual input, including the questions of step 268. The questions may be submitted by a human being interacting with a computer providing access to the model. In other embodiments, the questions may be submitted automatically by a further device which is operating to develop an understanding of malware and its prevalence in the telecommunications network. In some embodiments, a conversation may be developed between the model and the questioner, whether human or automated, in which the model prompts the questioner to ask additional, more detailed questions about particular aspects of the malware instances in the telecommunications network. An exemplary prompt from the model is, "would you like to know more about trojan horse malware introduced this week into IoT devices in Pittsburgh?" The questioner may direct the conversation to develop particular information from the model about the malware instances in the network.

At step 270, reporting is provided to the customer. In the exemplary embodiment, a customer of the operator of the mobility network is associated with IoT devices that communicate on the mobility network. The reporting includes information about existence of, prevalence of, risks created by, and solutions for malware in the IoT devices of the customer. In particular embodiments, the reporting information includes a textual description about the malware, the type of malware, possible sources of the malware, experience of other similarly situated customers with the malware, and solutions for possible elimination or resolution of the malware. The information is provided based on responses from the model during the questioning at the step 268. The information may be provided as a textual report directed to operations personnel of the customer. The wording of the report may be maintained at a relatively low technical level to ensure that the receiving personnel understand. If the receiving personnel are known to have expertise in network security issues, the technical content of the reporting may be elevated to more fully apprise the personnel of the malware in the network.

In addition to the textual monologue provided to the customer, an online dashboard or similar graphical presentation may be provided to the customer, as exemplified in FIG. 2B. The dashboard may be manipulated by the customer to highlight particular aspects of the reported information about malware among the user's devices communicating on the network.

In some embodiments, the reporting provided to the customer at step 270 may include suggestions or recommendations for remediation of the malware in the devices of the customer. An example suggestion is, "to prevent further damage due to this malware, you should update the operating software on your IoT devices. A software patch is available at the following network address." The customer may choose to follow the recommendations including by modifying the customer's devices over the network, step 272. In the noted example, the software patch may be downloaded by the customer and communicated over the mobility network of the network operator and installed on one or more IoT devices or other devices of interest. The mobility network may then convey a confirmation of the updated software from each respective IoT device to the customer. Moreover, the information about the updated software may be provided to the malware database to keep the database fully up to date with information about the network and devices.

Further, at step 274, the model may be validated by determining the effectiveness of the information provided to the customer and any modifications made by the customer. For example, if the model recommends applying a software patch to an IoT device to correct a malware problem, step 274 may include following up by collecting further data from the device pertaining to the malware of interest. If the malware of interest has been defeated or eliminated, the model and its recommendation are validated and, at step 276, the model is updated with this information. Similarly, if the malware of interest is not defeated, remains active or transitions to another form, this can serve as useful feedback that the model was not effective in this instance. In either case, positive feedback or negative feedback, this information can serve to continually update the model. The model can use information about its past successes or failures in developing future responses, thus improving the model.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
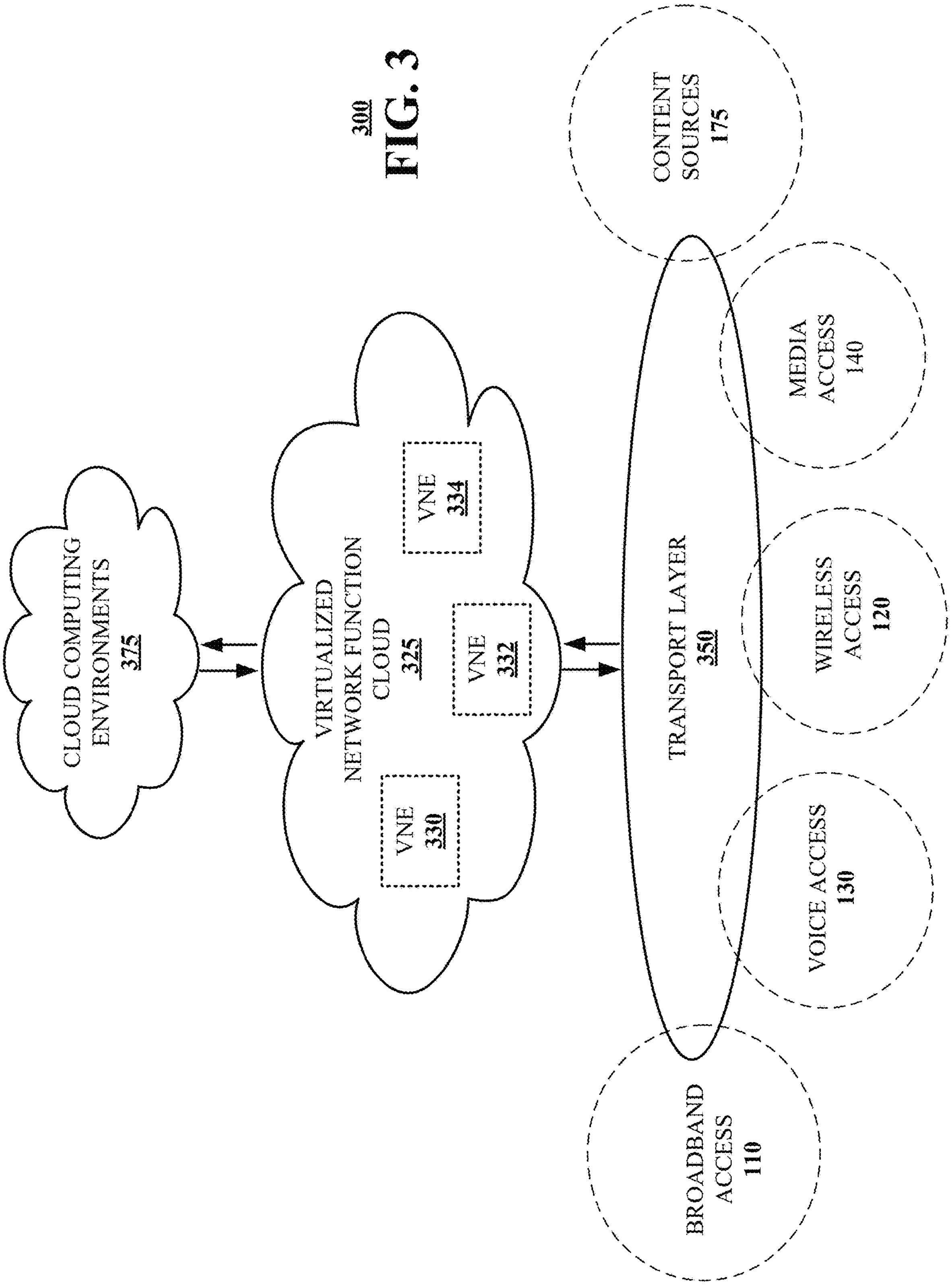
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of system 200, and method 250 presented in FIG. 1, FIG. 2A, FIG. 2B, FIGS. 2C, and 3. For example, virtualized communication network 300 can facilitate in whole or in part identifying a threat such as malware that may affect devices in a network, such as internet of things (IoT) devices or telematics devices communicating on a mobility network. A large language model (LLM) may be trained and provide expert advice in a readily understandable format which can be conveyed to a device operator to prevent damage to the IoT devices.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
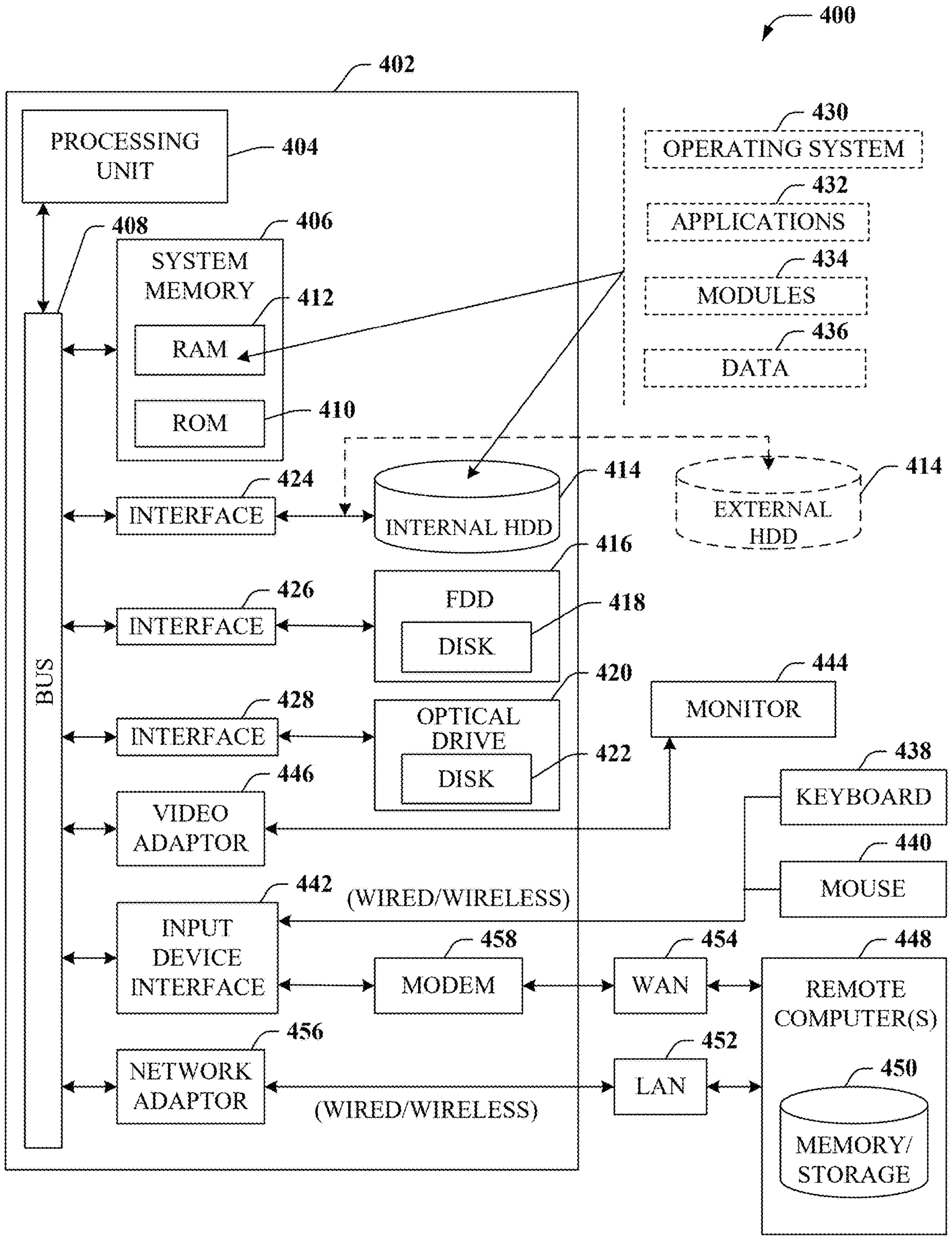
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part identifying a threat such as malware that may affect devices in a network, such as internet of things (IoT) devices or telematics devices communicating on a mobility network. A large language model (LLM) may be trained and provide expert advice in a readily understandable format which can be conveyed to a device operator to prevent damage to the IoT devices.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
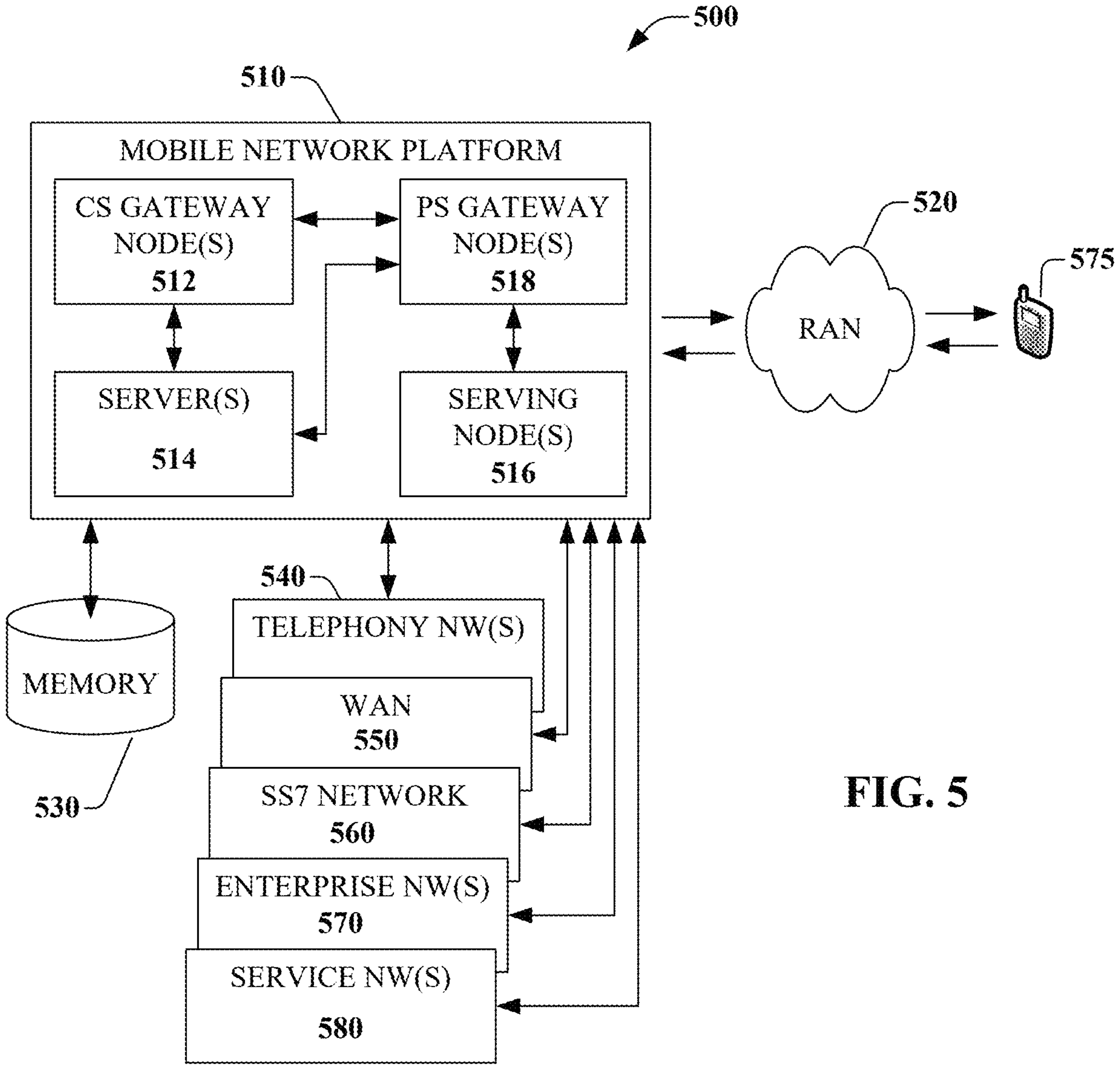
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part identifying a threat such as malware that may affect devices in a network, such as internet of things (IoT) devices or telematics devices communicating on a mobility network. A large language model (LLM) may be trained and provide expert advice in a readily understandable format which can be conveyed to a device operator to prevent damage to the IoT devices. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
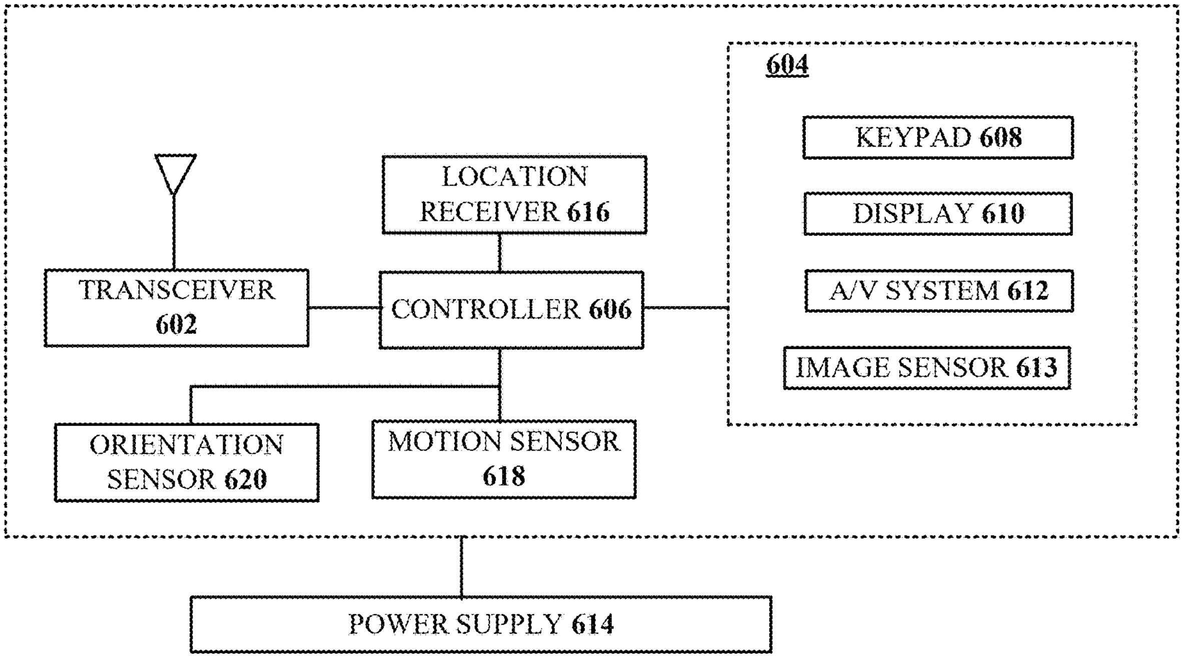
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, communication device 600 can facilitate in whole or in part identifying a threat such as malware that may affect devices in a network, such as internet of things (IoT) devices or telematics devices communicating on a mobility network. A large language model (LLM) may be trained and provide expert advice in a readily understandable format which can be conveyed to a device operator to prevent damage to the IoT devices.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)=\text{confidence}(\text{class})$. Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signalingstream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

receiving network and device data for internet of things (IoT) devices communicating on a mobility network;

providing at least some of the network and device data to a large language model (LLM);

collecting, from network sources, information about malware that may affect the IoT devices;

identifying keywords and key phrases in text of the information about malware that may affect the IoT devices;

removing stop words from the text of the information about malware that may affect the IoT devices;

receiving, from the LLM, information about malware affecting the IoT devices;

developing, based on the LLM, additional information about the malware affecting the IoT devices;

providing, to a device operator associated with the IoT devices, malware diagnostic information and malware prescriptive information, wherein the malware diagnostic information and malware prescriptive information are based on the developing additional information; and communicating, over the mobility network to the IoT devices, information to modify the IoT devices to protect the IoT devices from the malware.

2. The device of claim 1, wherein the communicating information to modify the IoT devices to protect the IoT devices comprises:

identifying a software patch for the IoT devices to protect the IoT devices from the malware, wherein the identifying the software patch is based on the prescriptive information; and communicating the software patch to the IoT devices to update software of the IoT devices.

3. The device of claim 1, wherein the developing additional information comprises conducting a dialog with the LLM.

4. The device of claim 1, wherein the collecting information about malware comprises:

crawling network locations to locate documents pertaining to malware;

storing the documents pertaining to malware in a malware database; and training the LLM based on information in the malware database.

5. The device of claim 4, wherein the operations further comprise:

removing, from the documents pertaining to malware, duplicate information contained in multiple documents.

6. The device of claim 4, wherein the operations further comprise:

removing bias from the documents pertaining to malware.

7. The device of claim 6, wherein the removing bias from the documents pertaining to malware comprises:

applying statistical stratification to the documents pertaining to malware to ensure that the documents pertaining to malware are representative of a population of malware information.

8. The device of claim 3, wherein the conducting a dialog with the LLM comprises:

providing, to the LLM, textual questions about the malware affecting the IoT devices;

receiving, from the LLM, textual answers to the textual questions, the textual answers providing additional details about a subject of the textual questions; and receiving, from the LLM, textual prompts about additional information about the subject of the textual questions.

9. The device of claim 8, wherein the providing textual questions about the malware affecting the IoT devices comprises:

providing textual questions about a malware type of the malware affecting the IoT devices;

providing textual questions about an initial access technique for infecting the IoT devices by the malware affecting the IoT devices;

providing textual questions about a computer operating system affected by the malware affecting the IoT devices; and providing textual questions about a geographical region associated with the IoT devices affected by the malware affecting the IoT devices.

10. A non-transitory machine-readable medium, comprising executable instructions that, when executed by a processing system including a processor, facilitate performance of operations, the operations comprising:

training an artificial intelligence (AI) model on data related to malware that may infect internet of things (IoT) devices communicating on a mobility network;

receiving, from the AI model, information about malware affecting the IoT devices;

developing, based on the AI model, additional information about the malware affecting the IoT devices, wherein the developing additional information comprises:

requesting information from the AI model about a malware type of the malware threat to the IoT devices;

requesting information about an initial access technique for infecting the IoT devices by the malware threat to the IoT devices;

requesting information about a geographical region associated with the IoT devices affected by the malware threat to the IoT devices; and providing, to a device operator associated with the IoT devices, diagnostic information about a malware threat to IoT devices in the mobility network and prescriptive information that may be used to avoid the malware threat, wherein the diagnostic information and the prescriptive information are based on the developing additional information.

11. The non-transitory machine-readable medium of claim 10, wherein the AI model comprises a large language model (LLM) and wherein the operations further comprise:

crawling network locations to locate documents pertaining to malware;

retrieving the documents pertaining to malware;

storing the documents pertaining to malware in a malware database; and training the LLM based on information in the malware database.

12. The non-transitory machine-readable medium of claim 11, wherein the operations further comprise:

removing, from the documents pertaining to malware, duplicate information contained in multiple documents to reduce an amount of information pertaining to malware stored in the malware database.

13. The non-transitory machine-readable medium of claim 10:

wherein the developing additional information comprises conducting a dialog with the AI model by providing textual questions to the AI model and receiving textual answers to the textual questions from the AI model.

14. The non-transitory machine-readable medium of claim 13, wherein the receiving textual answers to the textual questions from the AI model comprises:

receiving, from the AI model, a textual response providing additional malware information about a topic of a textual question; and receiving, from the AI model, a textual prompt to provide additional malware information about a topic of the textual response.

15. The non-transitory machine-readable medium of claim 13, wherein the providing textual questions to the AI model comprises:

providing textual questions about a malware type of the malware threat to the IoT devices;

providing textual questions about an initial access technique for infecting the IoT devices by the malware threat to the IoT devices;

providing textual questions about a computer operating system affected by the malware threat to the IoT devices; and providing textual questions about a geographical region associated with the IoT devices affected by the malware threat to the IoT devices.

16. A method, comprising:

receiving, by a processing system including a processor, operational data for Internet of Things (IoT) devices communicating on a mobility network, wherein the IoT devices are associated with a device operator;

providing, by the processing system, at least some of the operational data to a large language model (LLM), the LLM trained on information about malware in IoT devices;

collecting, by the processing system, network documents related to malware in IoT devices including a malware risk to the IoT devices;

storing, by the processing system, the network documents related to malware in IoT devices in a malware database;

receiving, by the processing system, from the LLM, information about a malware risk to the IoT devices;

receiving, by the processing system, additional malware risk information from the LLM, wherein the receiving the additional malware risk information is based on queries submitted to the LLM about the malware risk to the IoT devices; and providing, by the processing system to the device operator, diagnostic information about the malware risk to the IoT devices and prescriptive information that may be used to avoid the malware risk to the IoT devices.

17. The method of claim 16, comprising:

removing, by the processing system, duplicate information from the network documents related to malware in IoT devices to reduce an amount of information pertaining to malware stored in the malware database.

18. The method of claim 16, wherein the additional malware risk information from the LLM comprises:

receiving, by the processing system, textual responses about additional malware risks to IoT devices, wherein the textual responses are generated by the LLM based on textual queries submitted to the LLM.

19. The method of claim 18, wherein receiving the textual responses about additional malware risks to the IoT devices comprises:

receiving, by the processing system, information about a malware type of the additional malware risks to the IoT devices;

receiving, by the processing system, information about an initial access technique for infecting the IoT devices according to the additional malware risks to the IoT devices;

receiving, by the processing system, information about a computer operating system according to the additional malware risks to the IoT devices; and receiving, by the processing system, information about a geographical region associated with the additional malware risks to the IoT devices.

* * * * *